United States Patent [19]
Inuzuka et al.

[11] 3,731,166
[45] May 1, 1973

[54] DUPLEX DRIVING SYSTEM FOR AN ELECTRICALLY OPERATED MOVING OBJECT WITH AN ENDLESS CHAIN

[75] Inventors: Isao Inuzuka; Akinori Watanabe; Takeshi Oohira, all of Katsuta, Japan

[73] Assignee: Hitachi, Ltd., Tokyo, Japan

[22] Filed: May 11, 1971

[21] Appl. No.: 142,235

[52] U.S. Cl............318/35, 104/148 LM, 198/16 R, 310/13, 318/135
[51] Int. Cl..............................H02k 33/00
[58] Field of Search..................310/12, 13, 14; 318/35, 38, 135, 137; 198/16; 104/148 LM; 187/29

[56] References Cited

UNITED STATES PATENTS

| | | | |
|---|---|---|---|
| 3,577,929 | 5/1971 | Onoda et al. | 318/35 X |
| 2,731,212 | 1/1956 | Baker | 310/12 UX |
| 2,649,181 | 8/1953 | Hansen | 198/16 |
| 2,337,430 | 12/1943 | Trombetta | 310/13 |
| 2,363,336 | 11/1944 | Keeler | 310/13 UX |

FOREIGN PATENTS OR APPLICATIONS

| | | | |
|---|---|---|---|
| 1,007,716 | 5/1952 | France | 310/12 |

*Primary Examiner*—Bruce A. Reynolds
*Attorney*—Craig, Antonelli and Hill

[57] ABSTRACT

A duplex driving system comprising a driving means or linear motor for electromagnetically transmitting linear force interposed between a driving sprocket and an idle sprocket which is located at both sides of a frame, and on which an endless chain is wound.

1 Claim, 7 Drawing Figures

INVENTORS
ISAO INUZUKA,
AKINORI WATANABE AND
TAKESHI OOHIRA
BY Craig, Antonelli & Hill
ATTORNEYS

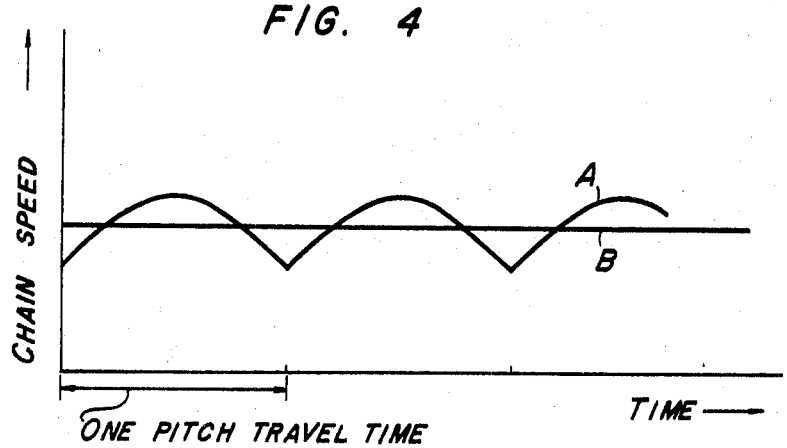
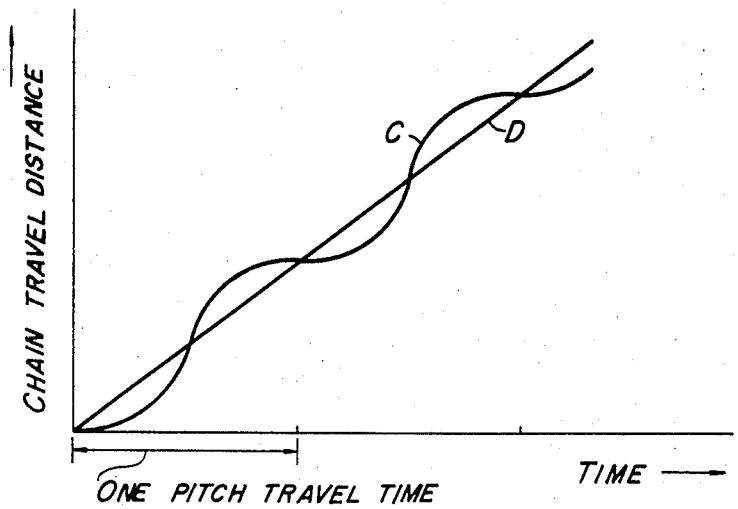

INVENTORS
ISAO INUZUKA,
AKINORI WATANABE AND
TAKESHI OOHIRA
BY Craig, Antonelli & Hill
ATTORNEYS

DUPLEX DRIVING SYSTEM FOR AN ELECTRICALLY OPERATED MOVING OBJECT WITH AN ENDLESS CHAIN

The present invention relates to a duplex driving system for an electrically operated moving object with an endless chain, or more particularly to an electrically operated moving object with an endless chain coupled with a plurality of step boards and suitable as a moving road or escalator for transporting passengers.

In the conventional escalator or moving road with an endless chain, one of two sprockets on which the endless chain is wound is driven by a motor located at an end of the system, as disclosed by U.S. Pat. No. 2,649,181. In such a system, the tension of the endless chain is maximum at the portion in touch with the driving sprocket, and therefore, the longer the moving road, the larger capacity of the endless chain is required. The recent trend of buildings and other factors of construction work has led to a long moving road and a high lift which in turn created the demand for a large-capacity chain. However, a moving road with a great length or an escalator with a high lift has to be provided having an extremely chain with a large capacity, size and pitch. This makes it necessary to increase the size and strength of various parts of the moving road or escalator to such a degree that the cost of the chain becomes very high.

Accordingly, it is an object of the present invention to provide a novel duplex driving system for a moving road or escalator.

Another object of the present invention is to provide a duplex driving system for an electrically operated moving road or escalator having an endless chain with a reduced capacity.

Still another object of the present invention is to provide a duplex driving system which can be effectively applied to a long moving road or an escalator with a high lift.

Other objects of the present invention will be readily apparent from the description which is made below with reference to an embodiment.

The objects of the present invention are achieved by a system comprising a frame, two sprockets including driving and idle sprockets arranged at both sides of said frame respectively, an endless chain wound on said two sprockets, and a driving means provided between said two sprockets for transmitting linear force electromagnetically.

Referring to the accompanying drawings,

FIG. 4 is a graph showing the relationship between the time and chain speed;

FIG. 5 is a graph showing the relationship between the time and the distance covered by the chain;

Figure 1:
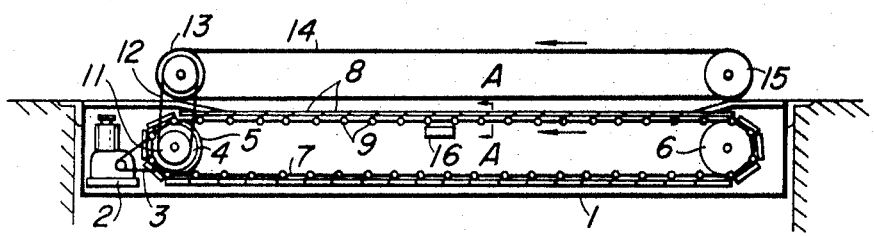
FIG. 1 is a diagram showing a general view of a moving road employing a driving system according to the present invention.

In a frame 1 of FIG. 1 are arranged a driving sprocket 5 and an idle sprocket 6 at the opposite ends thereof and a driving means 16 disposed at an intermediate portion between them for transmitting linear force electromagnetically. The sprockets 5 and 6 at both ends of the frame have a generally known tooth shape such as ASA or DIN, and on these sprockets is wound an endless chain 7 carrying a plurality of step boards 8 and support rollers 9 which are arranged at equal intervals of space. The driving sprocket 5 is driven by a motor 2 through a chain 3 and a sprocket 4. Numeral 11 shows a sprocket mounted on the same axis as the sprockets 4 and 5 for driving a handrail. When the sprocket 11 is rotated, the handrail-driving pulley 13 is also rotated through the chain 12, whereby the handrail 14 suspended between the driving pulley 13 and the idle pulley 15 is driven at the same speed as the endless chain 7 or step boards 8.

In this system, the driving means provided at an end thereof uses the sprocket 5 with the ASA tooth shape as in the conventional system. The character of the teeth is such that the running speed of the chain 7 driven by the sprocket with the teeth changes slightly in the course of a period of time in which the chain is advanced by 1 pitch, as shown by the line A of FIG. 4, the line B indicating an average speed. Under this condition, the relationship between the time required for covering one pitch and the distance covered is developed as shown by a curved line C of FIG. 5, while an average distance covered is shown by the straight line D.

The pulsating motion as mentioned above is unavoidable in the conventional sprockets with the ASA tooth shape, and if a similar sprocket is used for driving purposes in the intermediate portion, its pulsating motion is overlapped upon those of the sprockets at both ends. Therefore, unless they engage with the endless chain 7 in complete synchronism with each other, excessive tension will occur in the endless chain 7. Another disadvantage of the above-mentioned conventional sprocket is that, because of the difference in pitch between the bottom and top of a tooth, it engages with the endless chain 7 discontinuously, making it impracticable to use it in the intermediate portion of the system.

As a way to solve the above-mentioned problem, it has been suggested that the driving sprocket at the intermediate portion of the system be provided with involute teeth. The involute teeth enable the endless chain to be advanced continuously at constant speed and therefore the problem with the conventional system is overcome. However, an experimental study made by the applicant on a moving road shows that the intermediate sprocket is in contact with the endless chain through one or two teeth thereof only, and this makes it necessary to provide the sprocket with very strong teeth and a large diameter (at least 1,200 mm according to the experiment). As a result, the intermediate sprocket occupies a large space.

These last-mentioned difficulties are overcome by the present invention which is characterized by a means 16, generally called a linear motor, for transmitting linear force electromagnetically.

Figure 2:
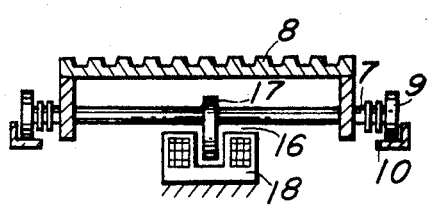
FIG. 2 is a cross-sectional view taken in the line A — A of FIG. 1 with a secondary conductor on the side of the moving object.
Figure 3:
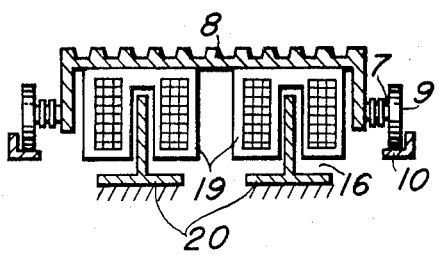
FIG. 3 is a cross-sectional view of the moving road taken in the line A — A of FIG. 1 and provided with a primary coil on the side of the moving object.

It is well known that a linear motor has a primary coil arranged adjacent to a secondary conductor so that an object mounted on the primary coil or secondary conductor makes a straight advance. FIG. 2 shows the secondary conductor 17 mounted on the step boards 8, the primary coil 18 being fixed on the frame 1. FIG. 3 shows an example in which a primary coil 19 and a secondary conductor 20 are fixed on the step boards 8 and frame 1 respectively.

In the above-mentioned constructions, when currents are made to flow in the primary coils 18 and 19, the step boards 8 which are a moving portion of the system are driven on rails 10 through rollers 9 as is well known.

The example of FIG. 2 in which the secondary conductor 17 is mounted on the step boards 8 can be made simpler in construction than the example of FIG. 3 in which the secondary coil 19 is attached on the step boards 8. Therefore, the present invention recommends the example as shown in FIG. 2.

The reason why the linear motor 16 is used in combination with the driving sprocket 5 which transmits mechanical linear force is that, as is well known, the electromagnetic linear force transmitting means 16, namely, the linear motor is low in efficiency at low speed and therefore it is difficult to achieve high efficiency by the linear motor only, and that a small load can be driven mechanically only by a highly efficient sprocket as in the conventional system.

Figure 6:
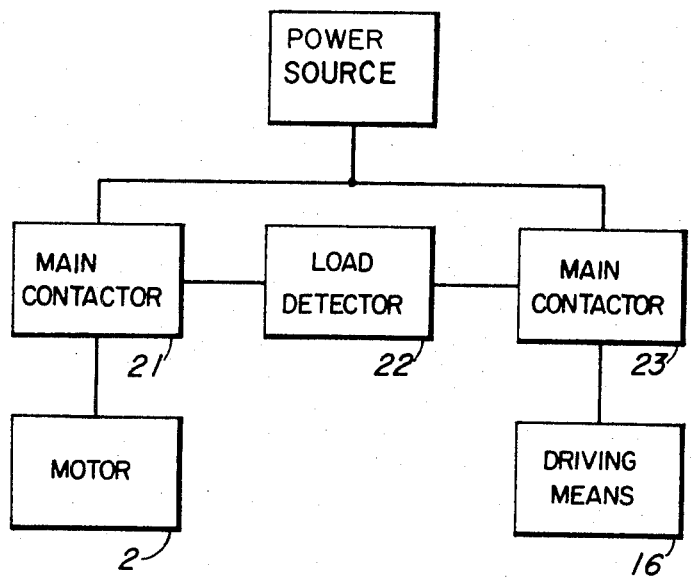
FIG. 6 is a block diagram showing an embodiment of a control circuit.

Explanation will be made now the reason why the driving chain for the step boards 8 is enough to be provided with a strength to stand a relatively small load compared with the conventional device. An embodiment of a control circuit used in such a case is shown in FIG. 6. At the time of starting the system, power is supplied to the motor 2 by closing a main contactor 21. When the passengers increase in number and a load detector 22 detects that a predetermined load level is exceeded, the primary coils 18 and 19 of the linear motor are excited by closing the main contactor 23 thereby to start a duplex driving. Such duplex driving is smoothly started, since linear force is generated under the condition where the primary coils 18 and 19 are electromagnetically coupled with the step boards.

Figure 7:
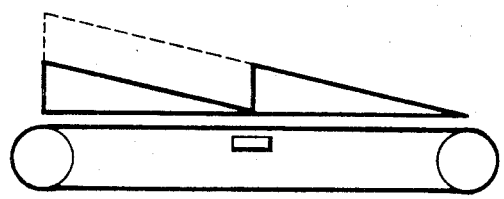
FIG. 7 is a diagram showing the distribution of tension in duplex driving.

The linear motor carries part of the burden imposed upon the step boards 8 and as a result, the tension of the endless chain 7 is distributed as shown in FIG. 7, whereby the load on the motor 2 for transmitting mechanical linear force is lessened and a chain with relatively low strength can bear the whole load.

When the load is lightened below the predetermined load level, the primary coils 18 and 19 are de-energized through the main contactor 23 under instructions from the load detector 22, so that the step boards 8 are driven only through the driving sprocket 5.

In the above-described embodiment of the present invention, the primary coils of the linear motor are arranged at one place only. Alternatively, the primary coils may be disposed at two or more places to achieve finer distribution of the linear force.

What we claim is:

1. A duplex driving system with an endless chain for an electrically operated object, comprising a driving sprocket mounted for rotation, a driving motor connected to said driving sprocket, an idler sprocket mounted for rotation, an endless chain wound on said two sprockets, a plurality of step boards mounted on said endless chain, a plurality of rollers operatively connected with said step boards for ascending passengers, rails for supporting said rollers, handrails provided over and along the upper side of said step boards and driven by pulleys operatively connected with said driving sprocket, and electromagnetic driving means arranged between said sprockets for transmitting a linear force to said endless chain in addition to the driving force provided by said drive motor, said electromagnetic driving means including secondary conductors mounted on the back of said step boards and primary coils arranged in a fixed position under the step boards for communication with said secondary conductors at the upper side of said endless chain.

* * * * *

UNITED STATES PATENT OFFICE
CERTIFICATE OF CORRECTION

Patent No. 3,731,166          Dated May 1, 1973

Inventor(s) Isao Inuzuka, et al

It is certified that error appears in the above-identified patent and that said Letters Patent are hereby corrected as shown below:

First page of patent, priority data omitted. Should read:

--Application No. 45/40941, Japan, May 15, 1970--

Signed and Sealed this

Eleventh Day of January 1977

[SEAL]

Attest:

RUTH C. MASON
*Attesting Officer*

C. MARSHALL DANN
*Commissioner of Patents and Trademarks*